United States Patent
Patino et al.

(10) Patent No.: US 6,242,894 B1
(45) Date of Patent: *Jun. 5, 2001

(54) BATTERY CONDITIONING SCHEME

(75) Inventors: Joseph Patino, Pembroke Pines; Gustavo D. Leizerovich, Aventura, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,355

(22) Filed: Jun. 8, 2000

Related U.S. Application Data

(62) Division of application No. 09/327,448, filed on Jun. 8, 1999.

(51) Int. Cl.[7] .......................................... H02J 7/04
(52) U.S. Cl. ............................................... 320/147
(58) Field of Search ................................. 320/147

(56) References Cited

U.S. PATENT DOCUMENTS

| | | | |
|---|---|---|---|
| 4,553,081 | 11/1985 | Koenck | 320/131 |
| 5,185,566 | 2/1993 | Goedken et al. | 320/113 |
| 5,287,286 | 2/1994 | Ninomiya | 320/DIG. 21 |
| 5,432,429 | 7/1995 | Armstrong, II et al. | 320/136 |
| 5,471,128 | 11/1995 | Patino et al. | 320/128 |
| 5,544,784 | 8/1996 | Malaspina | 221/135 |
| 5,621,458 | 4/1997 | Mann et al. | 348/232 |
| 5,649,299 | 7/1997 | Battin et al. | 455/62 |
| 5,675,371 | 10/1997 | Barringer | 348/6 |
| 5,677,944 | 10/1997 | Yamamoto et al. | 455/573 |
| 5,698,961 | 12/1997 | Kutz et al. | 320/125 |
| 5,751,134 | 5/1998 | Hoerner et al. | 320/124 |
| 5,764,031 | 6/1998 | Mishima | 320/124 |
| 5,789,903 | 8/1998 | Young et al. | 320/161 |
| 5,826,958 | 10/1998 | Avitan | 320/136 |
| 5,870,685 | 2/1999 | Flynn | 455/573 |
| 5,929,601 | 7/1999 | Kaib et al. | 320/113 |
| 5,982,146 | 11/1999 | Nguyen | 320/131 |

Primary Examiner—Peter S. Wong
Assistant Examiner—Pia Tibbits
(74) Attorney, Agent, or Firm—Barbara R. Doutre; Frank M. Scutch, III

(57) ABSTRACT

A portable radio (306) provides a selectable and/or automatic battery conditioning mode of operation (400). Battery conditioning is achieved by discharge state (410) that discharges the battery down to a predetermined threshold using existing radio circuitry (308).

6 Claims, 2 Drawing Sheets

-PRIOR ART-

-PRIOR ART-

BATTERY CONDITIONING SCHEME

CROSS REFERENCE TO RELATED APPLICATIONS

This is a divisional of application Ser. No. 09/327,448, filed Jun. 8, 1999, and assigned to Motorola, Inc.

TECHNICAL FIELD

This invention relates to battery conditioners for wireless devices, and more particularly to battery discharging methods and apparatus for wireless devices.

BACKGROUND

It is known in the art that nickel batteries that are repeatedly discharged to too high a voltage will develop what is referred to as "battery memory" or "voltage depression." This causes a loss of usable battery capacity until which time the battery is properly conditioned. To further accentuate the "memory" problem, battery fuel gauges found in wireless devices are often inaccurate. A typical "3 bar" radio fuel gauge display will show "0" bars when the battery still has approximately 10% of its capacity left. This 10% discharge point during transmit for a typical transceiver radio can be as high as 1.125V/cell. FIG. 1 is a graph 100 of prior art discharge curves for two nickel battery cells 102, 104. As shown in FIG. 1, discharging the nickel batteries down to 1.125V/cell causes the battery capacity of each cell to degrade to below 80% capacity within 20 cycles. This means that the typical user that recharges the battery as soon as the battery icon shows "0" bars will lose considerable battery capacity within 20 charge cycles due to the "memory" effect.

Many battery conditioners are available and are used for portable radio batteries to alleviate the "battery memory" problem and to enhance the battery cycle life performance. However, these conditioners are located external to the radio, typically residing in some form of table top charger or conditioner. The external conditioner typically requires significant board space and heat dissipation means. FIG. 2 is a block diagram of a prior art battery conditioning system described in U.S. Pat. No. 5,471,128 assigned to Motorola, Inc., which is herein incorporated by reference. Charging/Discharging system 200 includes a charge control circuit 224, a discharge control circuit 204, and a battery 222. The battery 222 is charged via the external charge circuit 224, and is discharged via the external discharge circuit 204.

The market demand for smaller wireless communication devices makes the use of large, heavy chargers and conditioners unattractive. There is a trend to incorporate much of the charging circuitry into the radio or battery. However, the conditioning circuitry has, thus far, been too cumbersome to incorporate into today's light weight products.

Accordingly, there is a need for an improved battery conditioning apparatus and technique that minimizes the use of external circuitry. Such a system would be beneficial of today's smaller communications devices.

DETAILED DESCRIPTION OF THE PREFERRED EMBODIMENT

Figure 1:
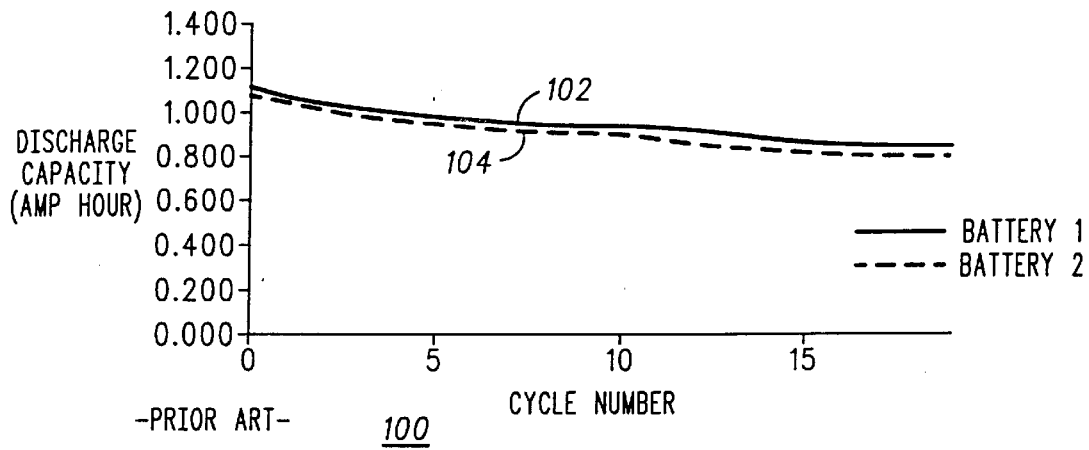
FIG. 1 is a prior art graph of nickel batteries being discharged to 1.125V/cell.
Figure 2:
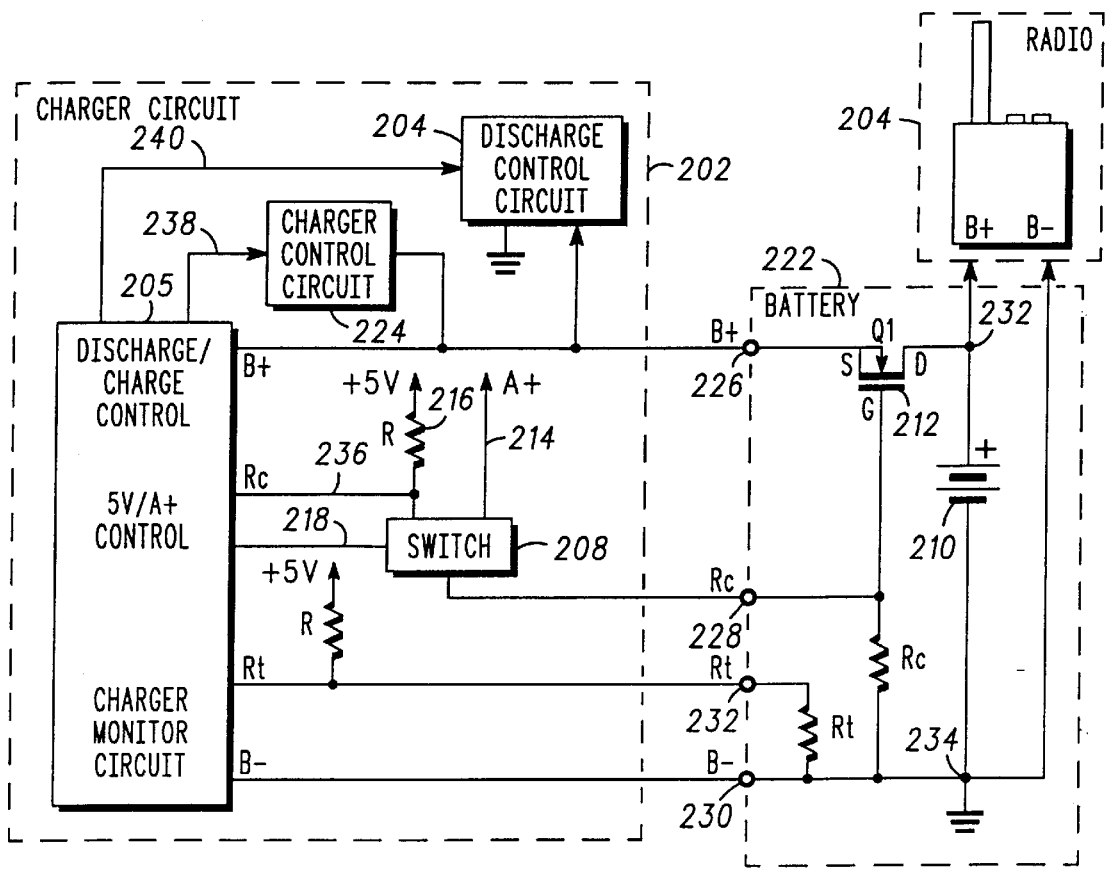
FIG. 2 is a block diagram of a prior art battery conditioning system.

While the specification concludes with claims defining the features of the invention that are regarded as novel, it is believed that the invention will be better understood from a consideration of the following description in conjunction with the drawing figures, in which like reference numerals are carried forward.

Briefly, in accordance with the present invention, a battery conditioning system is provided in which a radio provides the primary means of conditioning the battery using existing internal radio circuitry. By discharging the battery via the radio, the use of additional hardware and external circuitry have been eliminated. This discharging technique of the present invention accomplishes this by generating a current drain load within the radio on the battery thus taking advantage of existing radio hardware capability. The system to be described herein provides automatic conditioning of a battery as well as user controlled conditioning.

Figure 3:
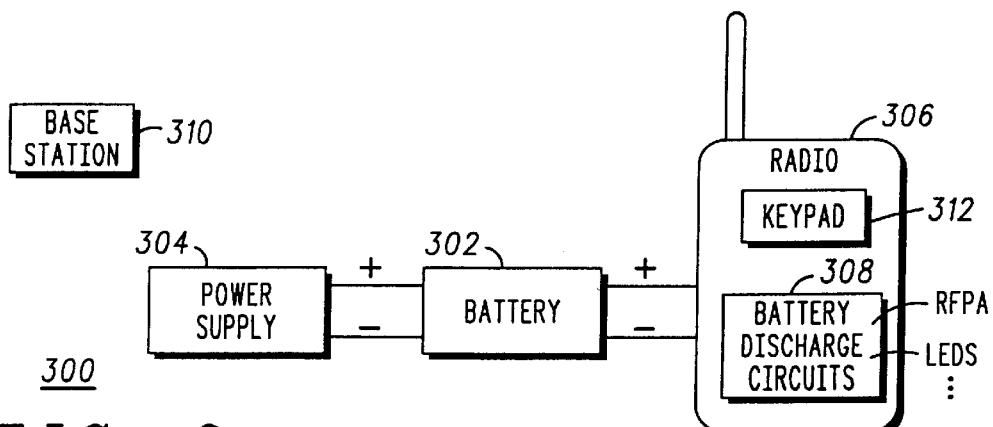
FIG. 3 is a conditioning system in accordance with the present invention.

Referring now to FIG. 3 there is shown a simplified block diagram of a conditioning system 300 in accordance with the present invention. System 300 includes a power supply 304 used for charging a battery operated radio formed of a battery 302 and radio 306. In accordance with the present invention, system 300 provides a controlled battery discharge mode of operation by switching in a high current radio load 308 on the battery 302 to bring the battery voltage down to a predetermined conditioned threshold. The battery conditioning can be initiated by a variety of ways. One way to enable conditioning of the battery is to have the user enter a function at the radio, such as via a keypad 312. The radio responds to the keypress by switching in the high current load 308 until the battery voltage reaches the predetermined threshold. Another way to enable the battery conditioning mode of operation is to periodically transmit a signal from a base station 310 to the radio 304 that forces the radio to enter the battery conditioning mode of operation. For example, the base station 310 could send out such a signal every two months to ensure that a radio (or a fleet of radios) gets conditioned. Yet another way of enabling the battery conditioning mode of operation is to have a smart battery automatically initiate the high current load prior to charging. Thus, conditioning system 300 of the present invention allows a user, a base station, and/or a smart battery to activate the battery conditioning mode of operation. Again, high current mode circuitry already in existence in the radio is used to condition the battery.

In the preferred embodiment of the invention, the radio's high current mode 308 is provided by the radio transmitter RF power amplifier bias circuitry. Additional circuitry, such as light emitting diodes (LEDs) can also be switched on to help drain the battery down to the desired predetermined threshold. Thus, the battery 302 is conditioned without additional circuitry cost to the system 300.

Figure 4:
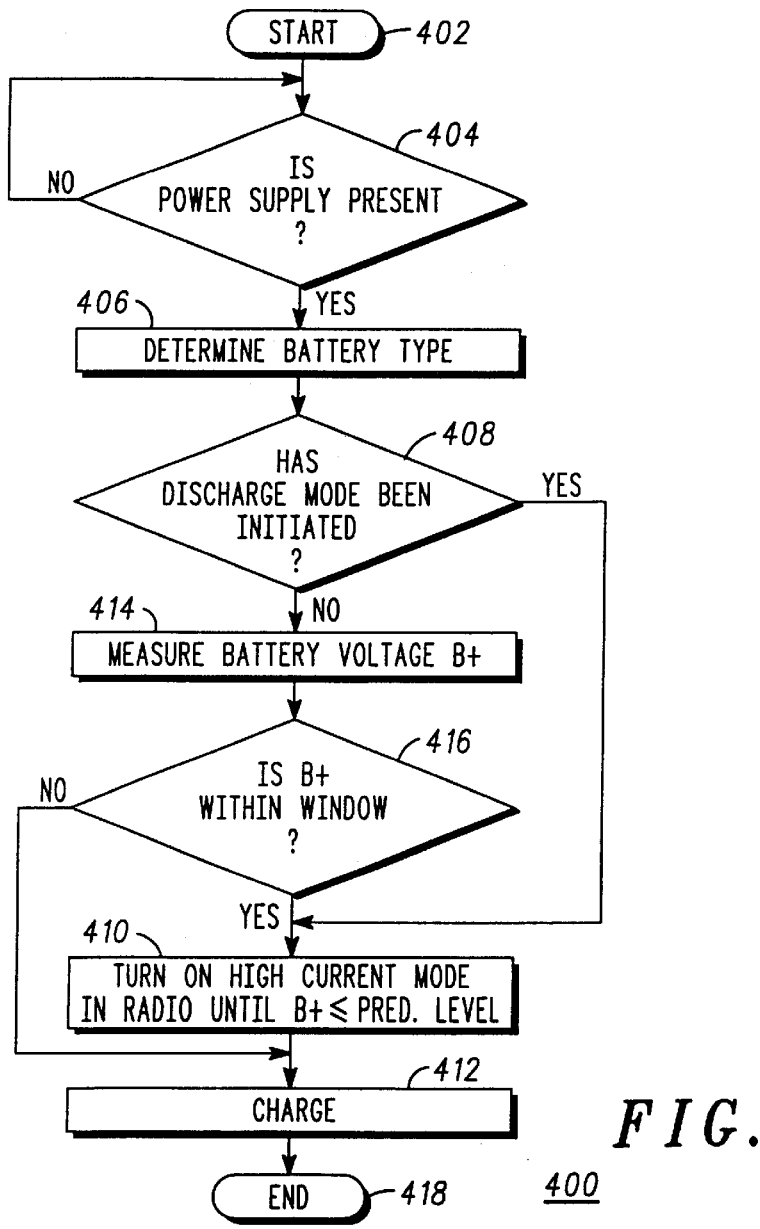
FIG. 4 is a flowchart of a conditioning technique in accordance with the present invention.

FIG. 4 is a flowchart showing a battery conditioning method in accordance with the present invention. Method 400 begins at step 402 with a battery operated radio. The radio determines at step 404 whether a power supply is present, and if so, the battery type is determined at step 406. battery type can be determined using a variety of techniques known in the art. Step 408 determines whether a discharge mode has been initiated, such as through a user initiated keypress, base station prompt stored in the radio, or smart battery prompt to the radio. If the discharge mode has been initiated at step 408, then a high current mode is enabled in the radio until the battery voltage, B+, reaches or falls below a predetermined conditioned threshold. The power supply then charges the conditioned battery at step 412 and exits at step 418.

If the discharge mode was not initiated at step 408, then the system enters a default mode using steps 414, 416, 410, and 412. The battery voltage is measured at step 414 and compared to a predetermined voltage window at step 416. The voltage window may vary depending on the type of battery being used. The predetermined voltage window indicates a level within which the radio will automatically initiate the high current mode at step 410. If the battery voltage does not fall within the predetermined voltage window at step 416, then the power supply will simply charge the battery at step 412 and exit at step 418. When the voltage level does fall within the predetermined voltage window at step 416, the battery is then conditioned by the radio at step 410, prior to being charged at step 412.

The battery conditioning method 400 of the present invention can thus be activated either directly by the user or indirectly via a prompt from a base station or smart battery. The conditioning method 400 is stored in the radio and has the advantage of using existing high current mode radio circuitry within the radio to achieve a conditioned battery.

Figure 5:
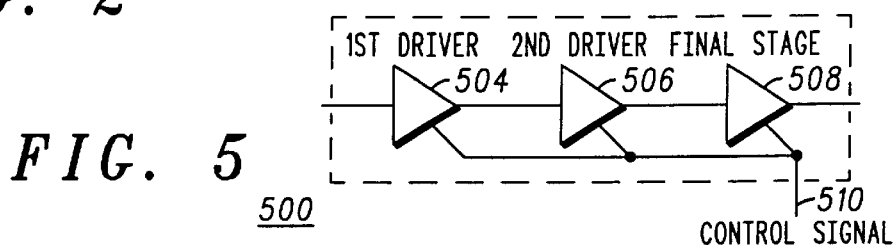
FIG. 5 is a partial block diagram of a transmitter RF power amplifier incorporating the conditioning system in accordance with the present invention.

The battery conditioning system 300 and technique 400 of the present invention provide selectable battery conditioning and eliminates the need for external conditioning circuitry. Again, a variety of existing radio circuits can be used to drain the battery down to a conditioned level. FIG. 5 shows an example of a transmitter RF power amplifier 500 that can be used as a load for the battery. Power amplifier circuit 500 includes first and second driver amplifiers 504, 506, and a final stage 508. The power amplifier quiescent current is turned on and off via a bias enable pin 510. In accordance with the present invention, the bias enable pin 510 may be enabled by a user controlled keypress, base station prompt, and/or smart battery. For some communication systems it may be preferable to only turn on the final stage of the RF power amplifier to avoid receiver sensitivity degradation.

Hence, there has been provided a radio that utilizes circuitry both as radio circuitry and as conditioning circuitry for a battery. System 300 and technique 400 provide a selectable battery conditioning system that can be activated by a user or automatically activated within the system itself. By applying a predetermined radio load to the battery until the battery voltage reaches a predetermined conditioned threshold, the battery gets conditioned without the use of external conditioning circuitry.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of discharging a battery, comprising the step of applying a predetermined radio load to the battery until the battery voltage reaches or falls below a predetermined conditioned threshold.

2. The method of claim 1, wherein the step of applying a predetermined radio load includes the step of activating power amplifier circuitry.

3. The method of claim 2, wherein the step of applying a predetermined radio load further includes the step of activating light emitting diodes (LEDs).

4. A battery powered portable radio, comprising:

a battery; and a radio coupled to the battery, wherein the radio includes circuitry operating both as radio circuitry and as selectable conditioning circuitry for the battery.

5. The battery powered portable radio of claim 4, wherein the circuitry includes a power amplifier.

6. The battery powered portable radio of claim 4, wherein the circuitry includes light emitting diodes.

* * * * *